US011258340B2

(12) United States Patent
Ikeda et al.

(10) Patent No.: US 11,258,340 B2
(45) Date of Patent: Feb. 22, 2022

(54) MANUFACTURING DEVICE FOR MAGNET EMBEDDED CORE

(71) Applicant: Kuroda Precision Industries Ltd., Kanagawa (JP)

(72) Inventors: Masanobu Ikeda, Chikuma (JP); Tomoaki Murayama, Ikeda-machi (JP); Osamu Fukuyama, Hadano (JP)

(73) Assignee: Kuroda Precision Industries Ltd., Kanagawa (JP)

( * ) Notice: Subject to any disclaimer, the term of this patent is extended or adjusted under 35 U.S.C. 154(b) by 0 days.

(21) Appl. No.: 17/049,137

(22) PCT Filed: Mar. 22, 2019

(86) PCT No.: PCT/JP2019/012041
§ 371 (c)(1),
(2) Date: Oct. 20, 2020

(87) PCT Pub. No.: WO2020/075324
PCT Pub. Date: Apr. 16, 2020

(65) Prior Publication Data
US 2021/0242756 A1    Aug. 5, 2021

(30) Foreign Application Priority Data

Oct. 11, 2018   (WO) .................. PCT/JP2018/037977

(51) Int. Cl.
*B23P 19/00*    (2006.01)
*H02K 15/03*    (2006.01)
(Continued)

(52) U.S. Cl.
CPC ....... *H02K 15/03* (2013.01); *B29C 45/14065* (2013.01); *H02K 1/28* (2013.01);
(Continued)

(58) Field of Classification Search
CPC .......... H02K 1/276; H02K 15/03; H02K 1/27; H02K 21/046; Y10T 29/49012; Y10T 29/49009; Y10T 29/49002; Y10T 29/5313
(Continued)

(56) References Cited

U.S. PATENT DOCUMENTS 9,705,369 B2    7/2017  Ishimatsu
9,997,968 B2 *  6/2018  Kitada ................. H02K 1/2766
(Continued)

FOREIGN PATENT DOCUMENTS

JP          S6225843        2/1987
JP          2013027104      2/2014
(Continued)

OTHER PUBLICATIONS

Chinese Office Action of CN201880017134.0 dated Jul. 23, 2020, 7 pages.
(Continued)

*Primary Examiner* — Thiem D Phan
(74) *Attorney, Agent, or Firm* — Dority & Manning, P.A.

(57) ABSTRACT

To allow necessary movement of a magnet in a magnet insertion hole during a manufacturing process so that a magnet embedded core in which the magnet is positioned as designed can be manufactured efficiently, a lower plate (12) and an upper plate (14) configured to contact against the end surfaces of a rotor core (2) are provided with pin members (37, 39) configured to enter a magnet insertion hole (4) to allow movement of a magnet (5) in a first direction, which is a separation direction of two mutually opposing inner surfaces (4C, 4D) of a magnet insertion hole (4), and to restrict movement of the magnet in a second direction orthogonal to the first direction as viewed in the axial direction of the magnet insertion hole (4), in a state where the magnet insertion hole is not filled with resin.

9 Claims, 15 Drawing Sheets

(51) Int. Cl.
  *H02K 1/28* (2006.01)
  *H02K 15/12* (2006.01)
  *B29C 45/14* (2006.01)
  *H02K 1/276* (2022.01)
  *B29L 31/00* (2006.01)

(52) U.S. Cl.
  CPC ...... *H02K 15/12* (2013.01); *B29L 2031/7498* (2013.01); *H02K 1/276* (2013.01); *Y10T 29/5313* (2015.01)

(58) Field of Classification Search
  USPC ......... 29/729, 596, 598, 604, 607, 732, 734, 29/736
  See application file for complete search history.

(56) References Cited

U.S. PATENT DOCUMENTS

| | | | |
|---|---|---|---|
| 10,608,513 | B2 | 3/2020 | Kino |
| 10,873,249 | B2 * | 12/2020 | Okudaira ............... H02K 15/12 |
| 2019/0044423 | A1 | 2/2019 | Fukuyama |
| 2019/0190361 | A1 | 6/2019 | Okudaira et al. |

FOREIGN PATENT DOCUMENTS

| | | |
|---|---|---|
| JP | 2014036486 | 2/2014 |
| JP | 2014046553 | 3/2014 |
| JP | 2014079056 | 5/2014 |
| JP | 2014083811 | 5/2014 |
| JP | 2014091220 | 5/2014 |
| JP | 2015035888 | 2/2015 |
| JP | 2015192576 | 11/2015 |
| JP | 2018130026 | 8/2018 |
| WO | WO2006022392 | 3/2006 |
| WO | WO2017179398 | 10/2017 |
| WO | WO2017179547 | 10/2017 |

OTHER PUBLICATIONS

International Search Report for PCT/JP2019/012041 dated Jun. 4, 2019, 2 pages.
Supplementary European Search Report for EP18899035 dated Jan. 31, 2020, 4 pages.

* cited by examiner

Fig.6
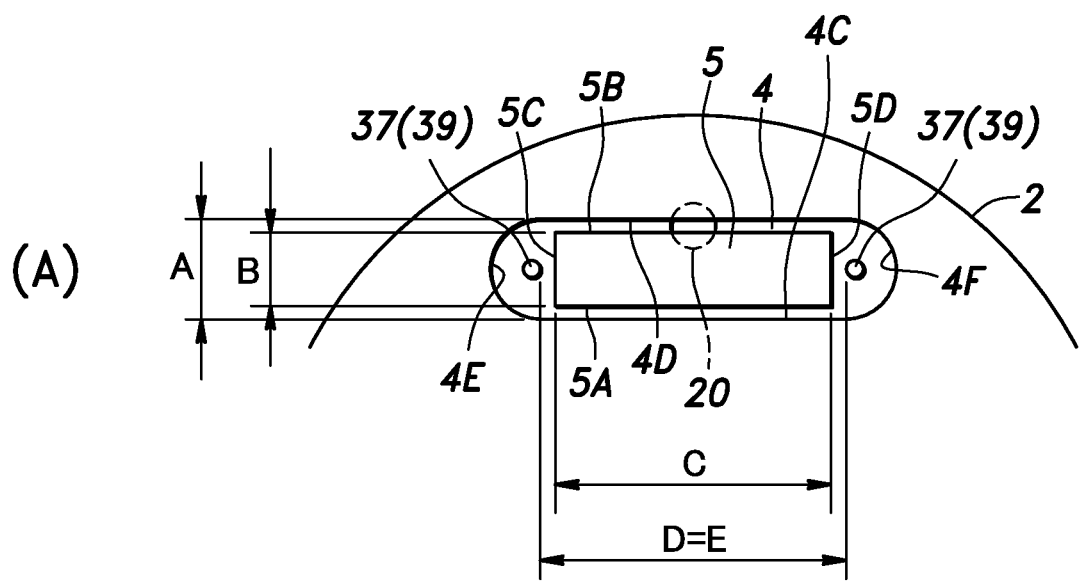
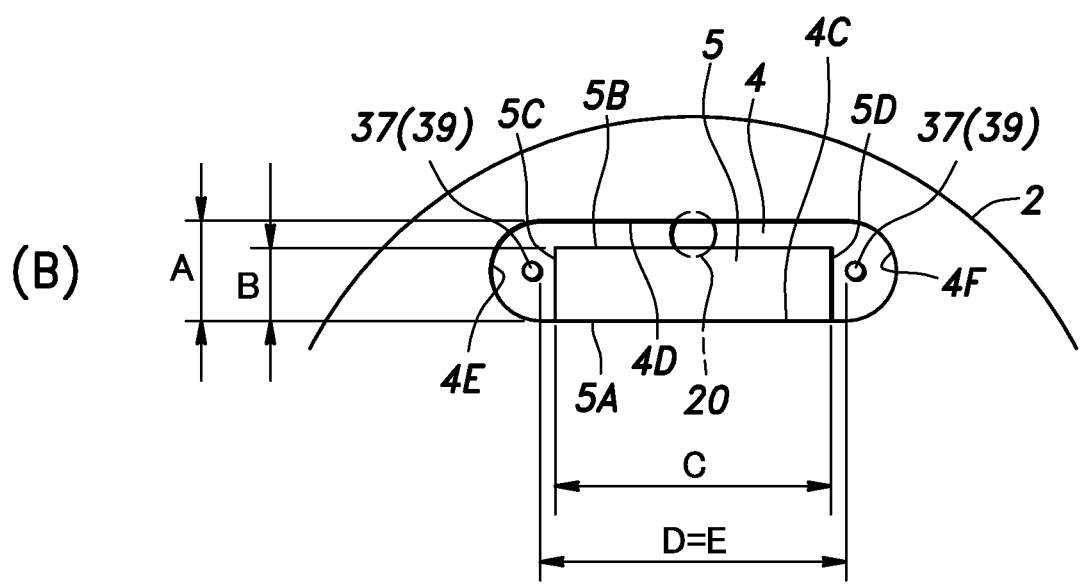

MANUFACTURING DEVICE FOR MAGNET EMBEDDED CORE

CROSS REFERENCE TO RELATED APPLICATIONS

This application is the U.S. National Stage entry of International Application Number PCT/JP2019/012041 filed under the Patent Cooperation Treaty having a filing date of Mar. 22, 2019, which claims priority to International Application Number PCT/JP2018/037977 filed under the Patent Cooperation Treaty having a filing date of Oct. 11, 2018, both of which are incorporated herein by reference.

TECHNICAL FIELD

The present invention relates to a manufacturing device and a manufacturing method for a magnet embedded core.

BACKGROUND ART

As a magnet embedded core used in rotating electric machinery such as an electric motor, there is known a magnet embedded core including a rotor core provided with multiple magnet insertion holes each extending along the axial direction and having open ends, where a rectangular parallelepiped shaped magnet is inserted in each of the multiple magnet insertion holes and each magnet is fixed to the rotor core by the resin filling the magnet insertion holes.

As a manufacturing device for a magnet embedded core of this kind, there is known a manufacturing device in which positioning pins are provided on the upper die and the lower die configured to sandwich the rotor core in the axial direction such that, when each magnet is fixed to the rotor core by the resin filling the magnet insertion hole, the positioning pins contact against the outer surfaces of the magnet to perform positioning of the magnet in the magnet insertion hole (for example, Patent Documents 1 and 2).

PRIOR ART DOCUMENT(S)

Patent Document(s)

Patent Document 1: JP2014-46553A
Patent Document 2: JP2018-107925A

SUMMARY OF THE INVENTION

Task to be Accomplished by the Invention

The method for filling the magnet insertion hole with the resin may include pressure-filling the magnet insertion hole with molten resin from the outside or causing an unfoamed foamable resin sheet pasted onto the magnet to foam and expand in the magnet insertion hole by heating or the like.

To achieve required magnetic properties, rotational balance, and durability of the aforementioned magnet embedded core, the filling pressure of the resin in the case of pressure-filling with the resin or the pressure produced by the foaming of the resin may be utilized to cause the magnet to move such that one outer surface of the magnet in the magnet insertion hole contacts the opposing inner surface of the magnet insertion hole.

In the case where such a method is adopted, if the positioning of the magnet is performed with the positioning pins configured to contact against the outer surfaces of the magnet, a frictional resistance between the magnet and the positioning pins may hinder the movement of the magnet in the magnet insertion hole so that one of the outer surfaces of the magnet may not contact the opposing inner surface of the magnet insertion hole as designed, whereby the required performance may not be achieved.

The present invention has been made in view of such prior art problems, and an object of the present invention is to allow necessary movement of the magnet in the magnet insertion hole during the manufacturing process so that the magnet embedded core in which the magnet is positioned as designed can be manufactured efficiently.

Means to Accomplish the Task

A manufacturing device for a magnet embedded core according to one embodiment of the present invention is a manufacturing device for a magnet embedded core in which a magnet is inserted in a magnet insertion hole which is formed in a rotor core to extend along an axial direction and to have both ends open, the magnet being fixed to the rotor core with resin, wherein the magnet includes at least two outer surfaces facing in mutually opposite directions and two end surfaces provided on respective side ends of the two outer surfaces, and the magnet insertion hole includes two inner surfaces having a spacing dimension larger than a spacing dimension of the two outer surfaces of the magnet so as to oppose the respective outer surfaces of the magnet, the manufacturing device comprising: a first plate and a second plate configured to contact against two end surfaces of the rotor core, respectively; and restriction members provided on at least one of the first plate and the second plate, wherein the restriction members are capable of entering the magnet insertion hole and provided at positions opposing the respective end surfaces of the magnet to allow movement of the magnet in a first direction, which is a separation direction of the two inner surfaces of the magnet insertion hole, and to restrict movement of the magnet in a second direction orthogonal to the first direction as viewed in the axial direction of the magnet insertion hole.

According to this configuration, necessary movement of the magnet in the magnet insertion hole during the manufacturing process is allowed, whereby the magnet embedded core in which the magnet is positioned as designed can be manufactured efficiently.

In the manufacturing device for the magnet embedded core according to the aforementioned embodiment, preferably, each end surface of the magnet is a flat surface extending in the first direction.

According to this configuration, movement of the magnet in the magnet insertion hole can be made smoothly without being hindered during the movement.

In the manufacturing device for the magnet embedded core according to the aforementioned embodiment, preferably, the restriction members are constituted of a pair of pin members, and an inner dimension between the pair of pin members is larger than an outer dimension of the magnet in a same direction as the second direction.

According to this configuration, necessary movement of the magnet in the magnet insertion hole during the manufacturing process is allowed more reliably. Preferably, the inner dimension between the pair of pin members is larger than the outer dimension of the magnet in the same direction as the second direction by about 0.2 to 0.4 mm.

In the manufacturing device for the magnet embedded core according to the aforementioned embodiment, preferably, the second plate includes a plate main body and a closure member provided on the plate main body via a compression spring member so as to be movable in the axial direction and configured to close an opening of the magnet insertion hole, and the restriction members are provided on the closure member.

According to this configuration, the closure of the opening of the magnet insertion hole by the closure member is achieved without fail and the function of the restriction members also is effected without fail.

The manufacturing device for the magnet embedded core according to the aforementioned embodiment preferably comprises a coupling member configured to couple the first plate and the second plate to each other such that a spring force of the compression spring member becomes a prescribed value.

According to this configuration, the closure of the opening of the magnet insertion hole by the closure member is achieved without fail.

In the manufacturing device for the magnet embedded core according to the aforementioned embodiment, preferably, the first plate includes a gate for resin filling, the gate being configured to be in communication with the magnet insertion hole at a position offset to one side in the first direction relative to the magnet insertion hole.

According to this configuration, the filling pressure of the resin injected to fill the magnet insertion hole from the gate causes the magnet to move in the magnet insertion hole without fail.

The manufacturing device for the magnet embedded core according to the aforementioned embodiment preferably comprises a heating device configured to heat the resin that is heat-foamable and located to be between one inner surface of the two inner surfaces of the magnet insertion hole and the outer surface of the magnet opposing the one inner surface.

According to this configuration, the pressure produced by the foaming of the resin causes the magnet to move in the magnet insertion hole without fail.

A manufacturing method for a magnet embedded core according to one embodiment of the present invention is a manufacturing method for a magnet embedded core that uses the manufacturing device for the magnet embedded core according to the aforementioned embodiment, the method comprising pressure-filling the magnet insertion hole with the resin that has been molten from an outside in a state where the magnet is inserted in the magnet insertion hole so that a filling pressure of the resin causes the magnet to move in the first direction while being guided by the restriction members to cause one of the outer surfaces of the magnet to contact an opposing one of the inner surfaces of the magnet insertion hole.

According to this manufacturing method, necessary movement of the magnet in the magnet insertion hole during the manufacturing process is allowed, and the magnet embedded core in which the magnet is positioned as designed can be manufactured efficiently.

A manufacturing method for a magnet embedded core according to one embodiment of the present invention is a manufacturing method for a magnet embedded core that uses the manufacturing device for the magnet embedded core according to the aforementioned embodiment, the method comprising: inserting the magnet provided with an unfoamed heat-foamable resin sheet on one of the outer surfaces thereof into the magnet insertion hole; and causing the resin sheet to foam in the magnet insertion hole so that a pressure produced by foaming causes the magnet to move in the first direction while being guided by the restriction members to cause one of the outer surfaces of the magnet to contact an opposing one of the inner surfaces of the magnet insertion hole.

Thus, according to the embodiment of the present invention, necessary movement of the magnet in the magnet insertion hole during the manufacturing process is allowed, whereby the magnet embedded core in which the magnet is positioned as designed can be manufactured efficiently.

Effect of the Invention

Thus, according to the embodiment of the present invention, necessary movement of the magnet in the magnet insertion hole during the manufacturing process is allowed, and the magnet embedded core in which the magnet is positioned as designed can be manufactured efficiently.

BRIEF DESCRIPTION OF THE DRAWINGS

FIG. 6 is an enlarged plan view of a main part of the magnet embedded core and the rotor core retaining jig according to the embodiment;

MODES FOR CARRYING OUT THE INVENTION

Preferred embodiments of the present invention are described in the following with reference to the appended drawings.

Figure 1:
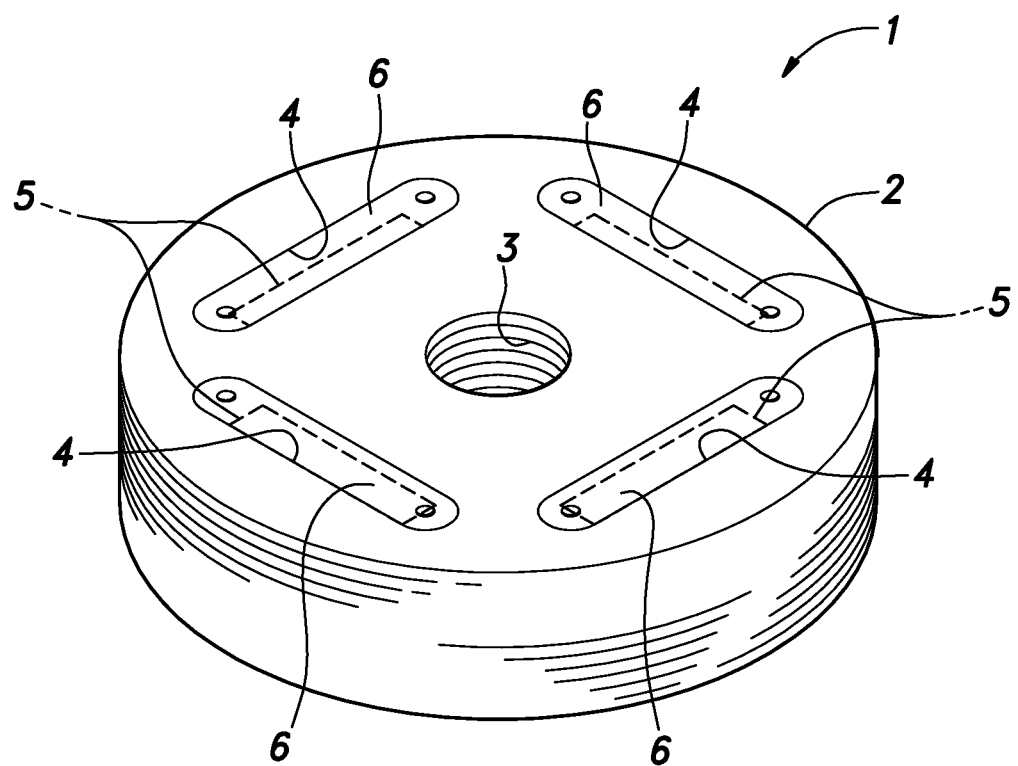
FIG. 1 is a perspective view showing an example of a magnet embedded core manufactured by a manufacturing method and a manufacturing device for a magnet embedded core according to one embodiment of the present invention.
Figure 2:
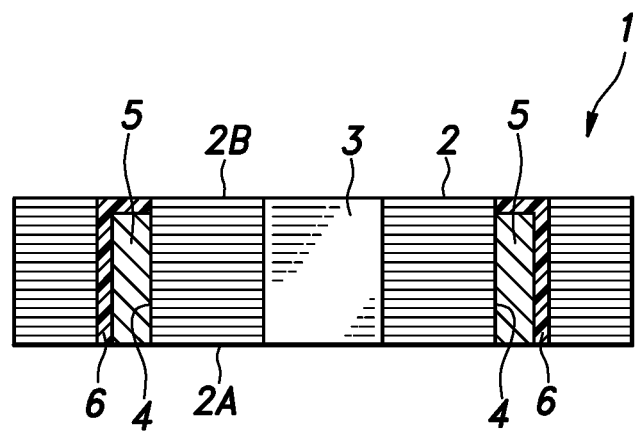
FIG. 2 is a vertical sectional view of the magnet embedded core.

First of all, a magnet embedded core 1 manufactured by a manufacturing device and a manufacturing method according to an embodiment of the present invention is described with reference to FIGS. 1 and 2.

The magnet embedded core 1 is a component part of rotating electric machinery such as an electric motor, and includes a rotor core 2. The rotor core 2 consists of a laminated iron core formed by stacking a plurality of electromagnetic steel sheets and joining the electromagnetic steel sheets together by using a known joining method (such as crimping, welding, gluing, etc.). The rotor core 2 is substantially annular in shape as viewed in an axial direction (in plan view), and is centrally provided with a shaft hole 3 extending therethrough in an axial direction.

The rotor core 2 is formed with multiple magnet insertion holes 4 each defining a substantially rectangular parallelepiped space. The magnet insertion holes 4 extend through the rotor core 2 in the axial direction, and each open out at a lower end surface 2A and an upper end surface 2B which are the end surfaces of the rotor core 2. Namely, each magnet insertion hole 4 is a through hole formed in the rotor core 2 along the axial direction and having open ends. Each magnet insertion hole 4 is a straight hole whose shape and dimension do not change in the axial direction of the rotor core 2, and as shown in FIG. 6, has inner surfaces 4C and 4D consisting of mutually parallel flat surfaces that oppose each other at a prescribed distance A in the radial direction of the rotor core 2 and extend in the tangential direction (chord direction) of the rotor core 2 and semi-cylindrical inner surfaces 4E and 4F that connect the inner surfaces 4C and 4D with each other at both end parts so that the magnet insertion hole 4 has a track shape as viewed in the axial direction of the rotor core 2. The inner surfaces 4C and 4D oppose later-described outer surfaces 5A and 5B of the magnet 5.

Here, the separation direction of the two inner surfaces 4C and 4D of the magnet insertion hole 4 is defined as a first direction and the direction orthogonal to the first direction as viewed in the axial direction of the magnet insertion hole 4 is defined as a second direction. In the illustrated embodiment, the first direction coincides with the radial direction of the rotor core 2 and the second direction coincides with the tangential direction (chord direction) of the rotor core 2.

A magnet 5 is received (inserted) in each magnet insertion hole 4. As shown in FIG. 6, each magnet 5 is in a rectangular parallelepiped shape having two outer surfaces (main surfaces) 5A, 5B facing in mutually opposite directions and parallel to each other and two end surfaces 5C, 5D provided on respective side ends of the two outer surfaces 5A, 5B, and consists of a permanent magnet (with or without magnetization) such as a ferrite-based sintered magnet or a neodymium magnet. The inner surfaces 4C and 4D of each magnet insertion hole 4 squarely oppose the outer surfaces 5A and 5B of the corresponding magnet 5. The two outer surfaces 5A and 5B of each magnet 5 are each a flat surface extending in the same direction as the second direction.

The dimensions of various parts of the magnet insertion hole 4 and the magnet 5 will be described with reference to FIG. 6. The spacing dimension A between the inner surfaces 4C and 4D of the magnet insertion hole 4 in the first direction is larger than the spacing dimension B between the outer surfaces 5A and 5B of the magnet 5 in the same the direction. The dimension D of the inner surfaces 4C and 4D of the magnet insertion hole 4 in the second direction is larger than the dimension (outer dimension) C of the outer surfaces 5A and 5B of the magnet 5 in the same direction.

Thereby, in each magnet insertion hole 4, a gap is created between the rotor core 2 and the magnet 5. This gap is filled with the resin 6. Each magnet 5 is fixed to the rotor core 2 by the resin 6 filling the gap. As the resin 6, thermosetting resin such as epoxy resin may be used.

In the illustrated embodiment, each magnet 5 is placed in the corresponding magnet insertion hole 4 to be offset inward (toward the center of the rotor core 2) so that the outer surface 5A of the rotor core 2 facing the center contacts against the inner surface 4C of the magnet insertion hole 4 opposing the outer surface 5A. Thereby, the position of the magnet 5 in each magnet insertion hole 4 in the radial direction of the rotor core 2 is uniformly determined. This, in cooperation with the magnet insertion holes 4 arranged at regular intervals in the circumferential direction of the rotor core 2, prevents the magnets 5 from causing any rotational imbalance of the rotor core 2.

Note that preferably, the entirety of the outer surface 5A of each magnet 5 is in surface contact with the corresponding inner surface 4C of the magnet insertion hole 4 in view of the stability of position of the magnet 5 in the magnet insertion hole 4.

Next, with reference to FIGS. 3 to 6, a rotor core retaining jig 10 used in the manufacture of the magnet embedded core will be described.

The rotor core retaining jig 10 includes a lower plate (first plate) 12 and an upper plate (second plate) 14 that oppose each other.

The lower plate 12 consists of a rectangular flat plate and the rotor core 2 is placed thereon at a prescribed position such that the flat lower end surface 2A contacts the flat top surface 12A. The position of the rotor core 2 relative to the lower plate 12 may be uniquely determined by positioning pins (not shown) or the like provided on the lower plate 12.

The lower plate 12 has gates 20 for resin filling each configured to individually communicate with a lower opening (one opening) 4A of the corresponding magnet insertion hole 4 and cull openings 22 communicating with the respective gates 20 and respective resin pots 80 of a later-described resin molding device 60. Each gate 20 is offset relative to the corresponding magnet insertion hole 4 toward one side in the rotor radial direction (first direction) or offset outward in the radial direction of the rotor core 2.

The upper plate 14 includes a plate main body 15 consisting of a rectangular flat plate opposing the upper end surface 2B of the rotor core 2 and substantially rectangular parallelepiped-shaped closure members 26 supported in a suspended manner from the plate main body 15 by respective bolts 24 in correspondence with the respective magnet insertion holes 4 such that each closure member 26 is movable in the vertical direction (the axial direction of the rotor core 2).

Each closure member 26 includes a flat bottom surface 26A having an area larger than that of the upper opening (another opening) 4B of the magnet insertion hole 4 and capable of contacting against the flat upper end surface 2B of the rotor core 2. The lower limit position of each closure member 26 is determined by contacting of a head 24A of the associated bolt 24 against a shoulder-shaped bottom of an associated bolt insertion hole 15A formed in the plate main body 15.

A compression coil spring 28 is attached between the plate main body 15 and each closure member 26. The compression coil spring 28 is individually provided for each closure member 26, and urges the closure member 26 toward the lower plate 12. In the illustrated embodiment, the closure members 26 and the compression coil springs 28 are provided for the respective magnet insertion holes 4, but they may be provided for respective groups of adjoining magnet insertion holes 4.

The lower plate 12 and the plate main body 15 are coupled to each other by vertically extending coupling rods 30 serving as coupling members in four positions at front and rear on left and right sides, with the rotor core 2 being sandwiched between the lower plate 12 and the closure members 26.

Details of the coupling structure of the lower plate 12 and the plate main body 15 by the coupling rods 30 will now be described. Each coupling rod 30 includes a rod portion 30A and flange portions 30B, 30C respectively provided at upper and lower ends of the rod portion 30A.

The lower plate 12 and the plate main body 15 are formed with engagement grooves 32, 34 in the form of cutouts each extending linearly in the left and right direction and opening at one of mutually parallel left and right outer edges (peripheral edges) of these plates 12, 14. The engagement grooves 32, 34 are provided on each of the mutually parallel two sides (left side and right side) of the lower plate 12 and the plate main body 15 and are arranged to be vertically aligned. As shown in partial enlarged perspective views (A) and (B) in FIG. 3, the engagement grooves 32, 34 respectively include recessed grooves 32A, 34A which the flange portions 30B, 30C of the coupling rod 30 can engage, and slit-shaped openings 32B, 34B formed in the bottoms of the recessed grooves 32A, 34A such that the rod portion 30A can pass therethrough, and the flange portions 30B, 30C contact against shoulder portions 32C, 34C defined by parts of the recessed grooves 32A, 34A remaining on both sides of the openings 32B, 34B.

Thus, by engagement of each coupling rod 30 with the lower plate 12 and the plate main body 15, the coupling rods 30 couple the lower plate 12 and the plate main body 15 to each other such that the spring force of each compression coil spring 28 becomes a prescribed value. The spring force of each compression coil spring 28 (amount of deformation of each compression coil spring 28) produced in this coupled state is set to an appropriate value by an axial length of the rod portion 30A.

Thereby, the lower plate 12 and the plate main body 15 are joined in a prescribed positional relationship (uniquely determined positional relationship), and each closure member 26 is pressed against the upper end surface 2B of the rotor core 2 due to the spring force of the compression coil spring 28 to close the upper opening 4B of the corresponding magnet insertion hole 4. The joining of the lower plate 12 and the plate main body 15 in the prescribed positional relationship uniquely determines the position of each closure member 26 relative to the rotor core 2 on the lower plate 12.

Base ends (lower ends) 36A of plate pressing rods 36 are fixed to the lower plate 12 at two positions that are spaced from each other in the left and right direction and in the front and rear direction. The plate pressing rods 36 extend vertically upward from the lower plate 12 to pass through respective through holes 38 formed in the plate main body 15 in a loosely fitted manner, and each include a free end (upper end) 36B located above the plate main body 15. Note that the number of arrangement positions of the plate pressing rods 36 is not limited to two and may be more than two.

The lower plate 12 has pin members 37 fixed thereto and each closure member 26 of the upper plate 14 has pin members 39 fixed thereto such that a pair of pin members 37 and a pair of pin members 39 serve as restriction members for each magnet insertion hole 4. Each pin member 37 projects upward from the lower plate 12 and is capable of entering the associated magnet insertion hole 4 from below to oppose the end surface 5C or 5D of the magnet 5 on the corresponding side in the magnet insertion hole 4. Each pin member 39 projects downward from the closure member 26 and is capable of entering the associated magnet insertion hole 4 from above to oppose the end surface 5C or 5D of the magnet 5 on the corresponding side in the magnet insertion hole 4.

As shown in FIG. 6, the inner dimension E between each pair of pin members 37 (the spacing dimension between each pair of pin members 37 in the second direction) and the inner dimension E between each pair of pin members 39 (the spacing dimension between each pair of pin members 39 in the second direction) are equal to each other and are larger than the outer dimension C of the magnet 5 in the same direction as the second direction. Thereby, in the state where the magnet insertion hole 4 is not filled with the resin 6, each pin member 37, 39 does not hinder the movement of the magnet 5 in the magnet insertion hole 4 in the first direction (the rotor radial direction), namely, allows the movement of the magnet 5 in the magnet insertion hole 4 in the first direction of the magnet insertion hole 4 and restricts the movement of the magnet 5 in the magnet insertion hole 4 in the second direction (the rotor tangential direction) within a range of "the inner dimension E−the outer dimension C."

In the drawings, "the inner dimension E−the outer dimension C" is shown exaggerated, but actually, "the inner dimension E−the outer dimension C" may be less than or equal to 1 mm, preferably about 0.2 mm to 0.4 mm. Note that the aforementioned dimension D of the inner surfaces 4C and 4D of the magnet insertion hole 4 in the second direction is equal to the inner dimension E or may be larger than the inner dimension E such that even if the magnet 5 moves in the second direction within the range of the inner dimension E, the magnet 5 does not run onto the semi-cylindrical inner surface 4E or 4F to assume an inclined attitude.

In the setting of the rotor core 2 in the rotor core retaining jig 10 using a core setting device 40, first, the lower plate 12 is placed on a support base 42, the magnets 5 are inserted into the respective magnet insertion holes 4, and then, the upper plate 14 is placed on the rotor core 2 such that each closure member 26 is aligned with the associated magnet insertion hole 4. As shown in (A) of FIG. 6, the insertion of the magnet 5 into each magnet insertion hole 4 is performed such that the magnet 5 is placed at a substantially central part of the magnet insertion hole 4.

Subsequently, a pressurizing device 48 is driven to press a pressurizing plate 52 against the upper plate 14 to thereby cause compressive deformation in each compression coil spring 28. In this state, the flange portions 30B, 30C of the coupling rods 30 are inserted into the corresponding engagement grooves 32, 34 from both left and right sides. Thereafter, when the pressing of the upper plate 14 by the pressurizing plate 52 is released, the spring force of the compression coil springs 28 causes the flange portions 30B, 30C to be pressed against the shoulder portions 32C, 34C.

Figure 3:
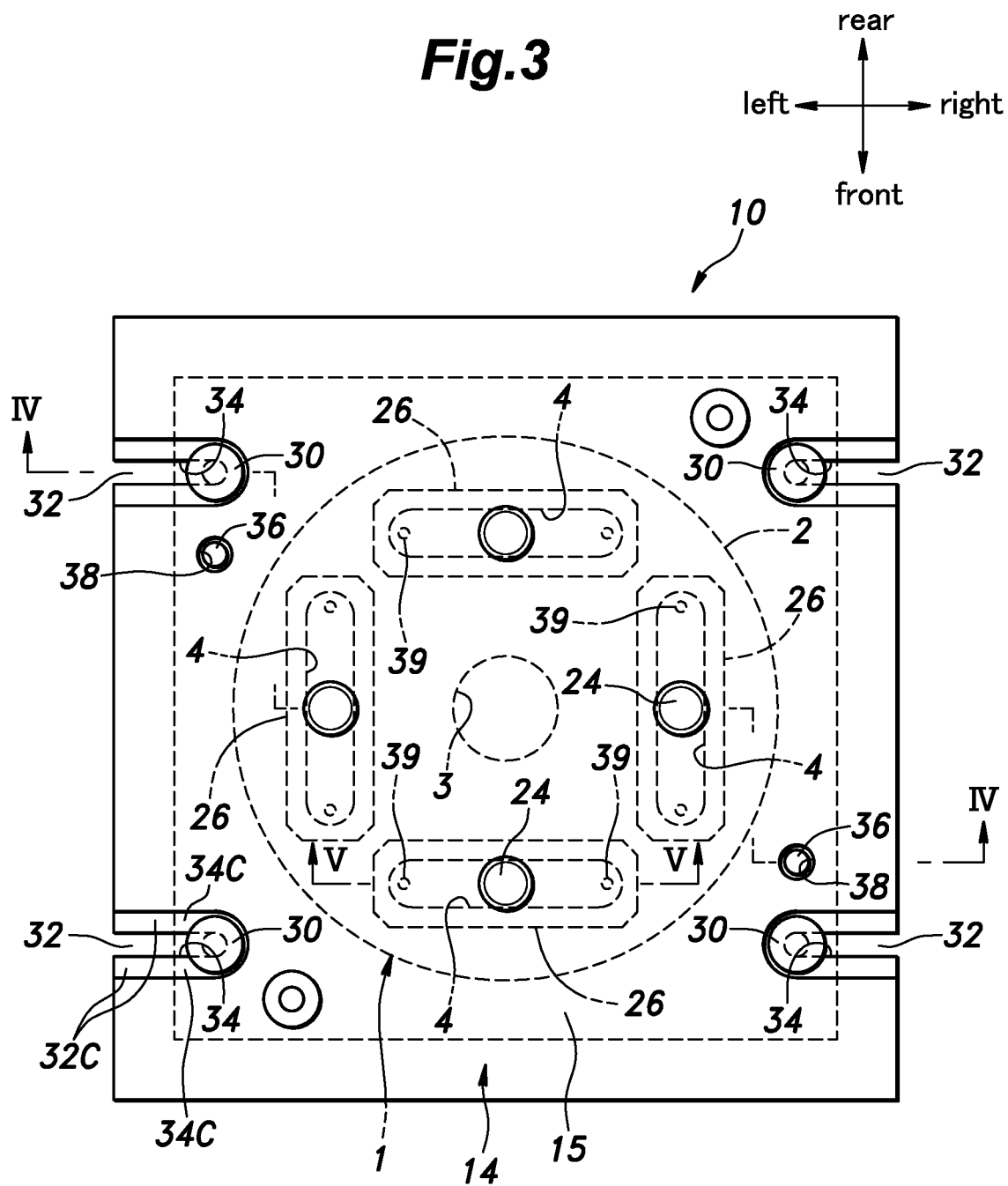
FIG. 3 is a plan view of a manufacturing device (rotor core retaining jig) for the magnet embedded core according to the one embodiment of the present invention.

Thereby, the lower plate 12 and the plate main body 15 of the upper plate 14 are coupled to each other by the coupling rods 30, with the spring force of each compression coil spring 28 having the prescribed value. As a result, as shown in FIG. 3, the rotor core 2 can be treated, together with the rotor core retaining jig 10, as a sub-assembly in that the opening 4B of each magnet insertion hole 4 is closed by the corresponding closure member 26 with a pressing force resulting from the spring force of the compression coil spring 28 and each pin member 37, 39 having entered the associated magnet insertion hole 4.

Figure 8:
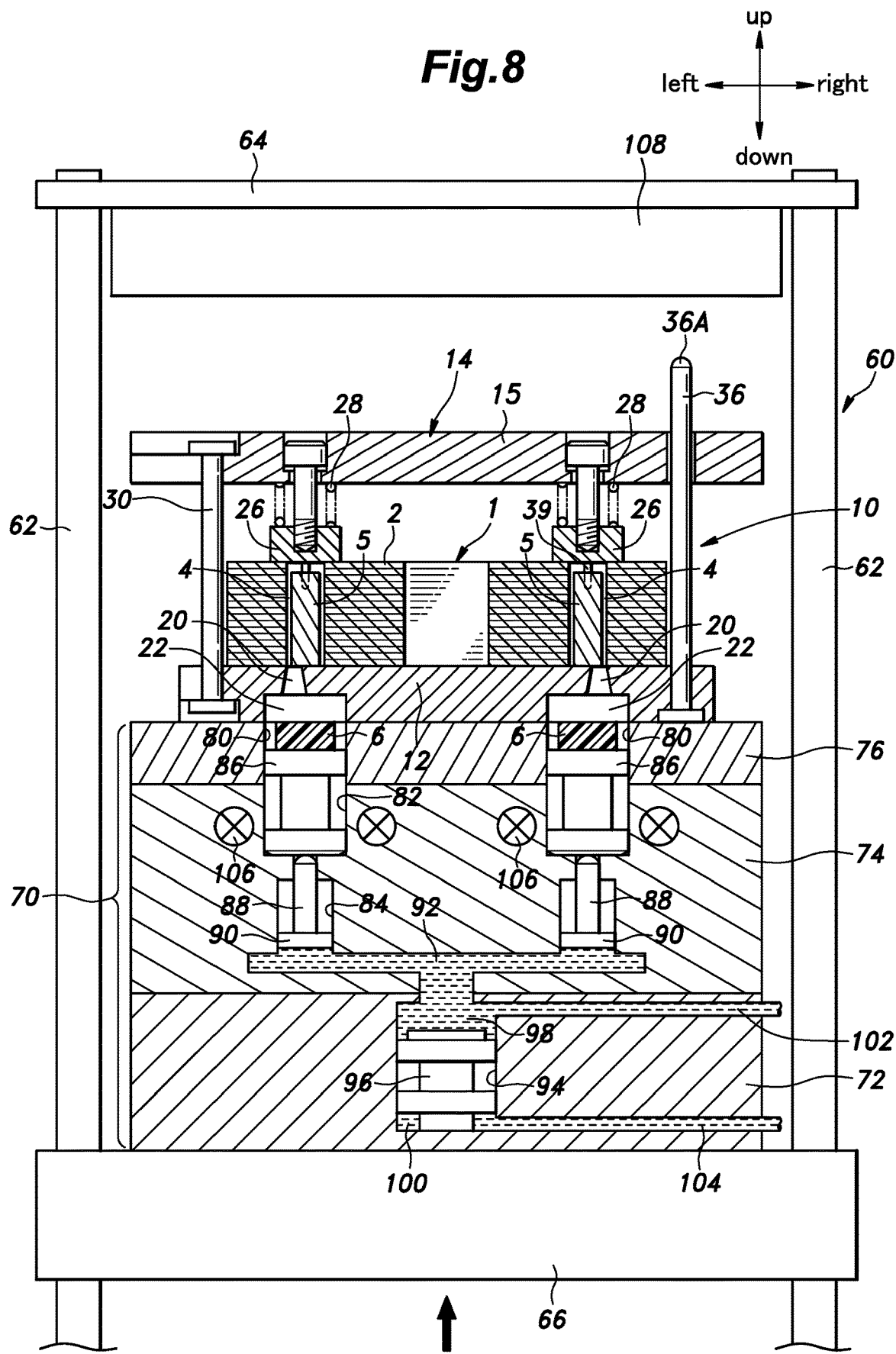
FIG. 8 is a vertical sectional view showing a state where a lower movable member of the manufacturing device (resin filling device) for the rotor core retaining jig according to the present embodiment is lowered.

Next, with reference to FIGS. 8 to 10, another embodiment of the resin molding device 60 and the manufacturing method for the magnet embedded core 1 will be described.

The resin molding device 60 includes multiple post members 62 that extend vertically, a fixed platen 64 fixed to upper ends of the post members 62, and a movable platen 66 that is movable vertically and guided by the post members 62. The movable platen 66 is driven in the vertical direction by a drive device (not shown) using hydraulic pressure or the like, and can move toward and away from the fixed platen 64.

A lower base member 70 is mounted on the movable platen 66. The lower base member 70 is constituted of an assembly in which a lower member 72, an intermediate member 74, and an upper member 76 are stacked. On the upper member 76, the sub-assembly of the rotor core 2 and the rotor core retaining jig 10 is placed in a state where the movable platen 66 is lowered, as shown in FIG. 8.

The upper member 76 is formed with multiple resin pots 80 corresponding to the respective magnet insertion holes 4 of the rotor core 2. Each resin pot 80 opens in the top surface of the upper member 76 to communicate with the corresponding cull opening 22. The intermediate member 74 is formed with plunger chambers 82 and push rod chambers 84 communicating with the associated resin pots 80. As a resin introducing device for introducing molten resin from the resin pots 80 into the magnet insertion holes 4 via the gates 20, each plunger chamber 82 is provided with a plunger 86 to be vertically movable and each push rod chamber 84 is provided with a push rod 88 to be vertically movable. The resin pots 80, the plunger chambers 82, and the cull openings 22 are bores having the same inner diameter, and each plunger 86 can move into the corresponding cull opening 22 from the corresponding plunger chamber 82.

Solid resin 6 having a block shape is placed on the plunger 86 in each resin pot 80.

Each push rod 88 contacts against the corresponding plunger 86 at an upper end thereof to move the plunger 86 upward. Each push rod 88 has a pressure receiving flange 90 at a lower end thereof, and a hydraulic pressure of hydraulic oil in a manifold oil passage 92 formed in the intermediate member 74 is applied on each pressure receiving flange 90. The lower member 72 is formed with a cylinder chamber 94. The cylinder chamber 94 is provided with a piston 96 so as to be movable vertically. The piston 96 defines an upper oil chamber 98 on an upper side thereof such that the upper oil chamber 98 communicates with the manifold oil passage 92, and defines a lower oil chamber 100 on an underside thereof. The upper oil chamber 98 and the lower oil chamber 100 are connected to a hydraulic pressure source (not shown) by oil passages 102, 104 and the like formed in the lower member 72.

In the lower base member 70, heaters 106 for heating the lower base member 70 are embedded.

An upper opposing member 108 is mounted to a lower part of the fixed platen 64. The upper opposing member 108 opposes the lower base member 70 via the rotor core retaining jig 10 on the lower base member 70, and is relatively movable toward and away from the lower base member 70 as the movable platen 66 is movable toward and away from the fixed platen 64.

Figure 9:
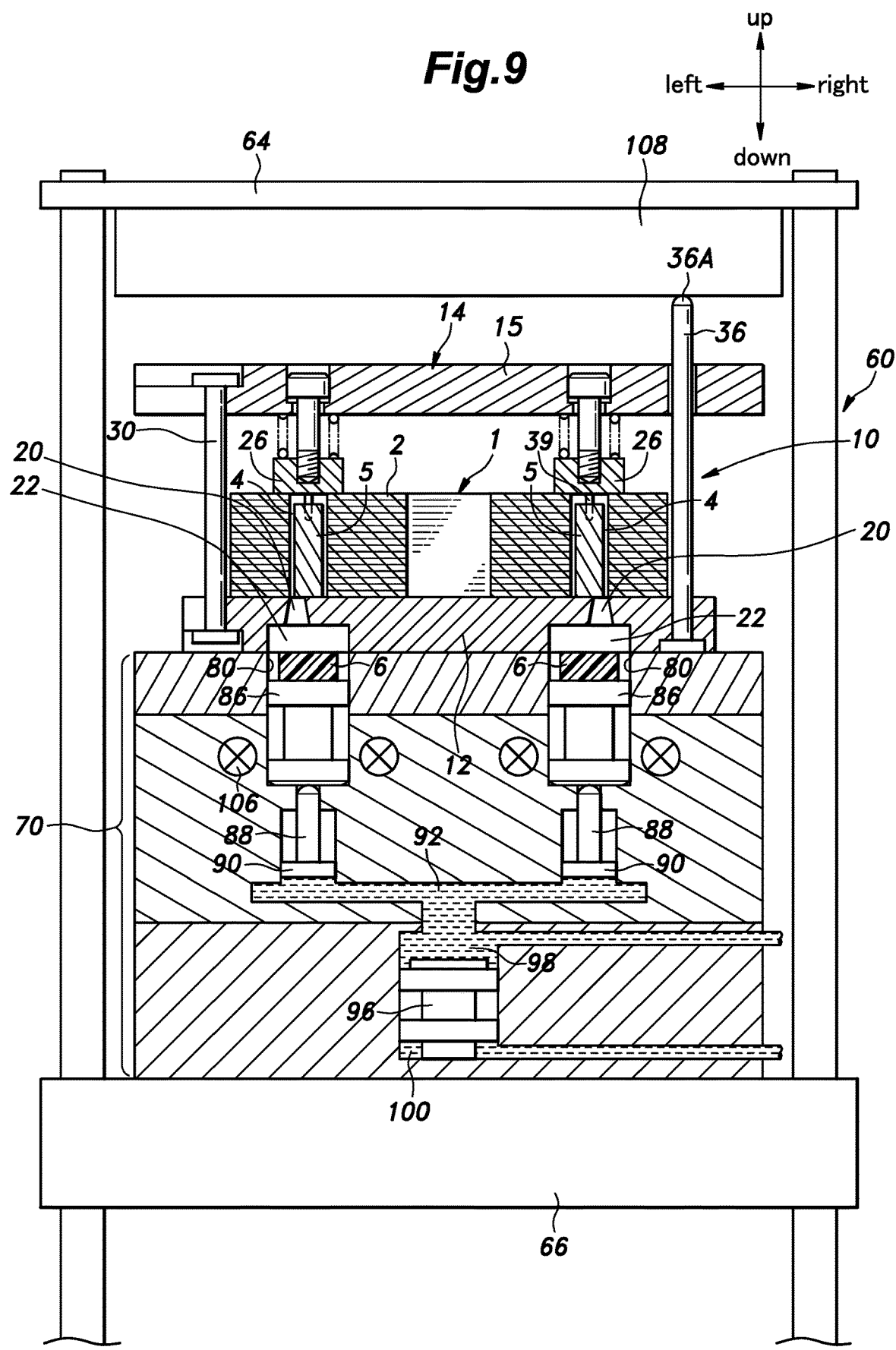
FIG. 9 is a vertical sectional view showing a state where the lower movable member of the manufacturing device is lifted.
Figure 10:
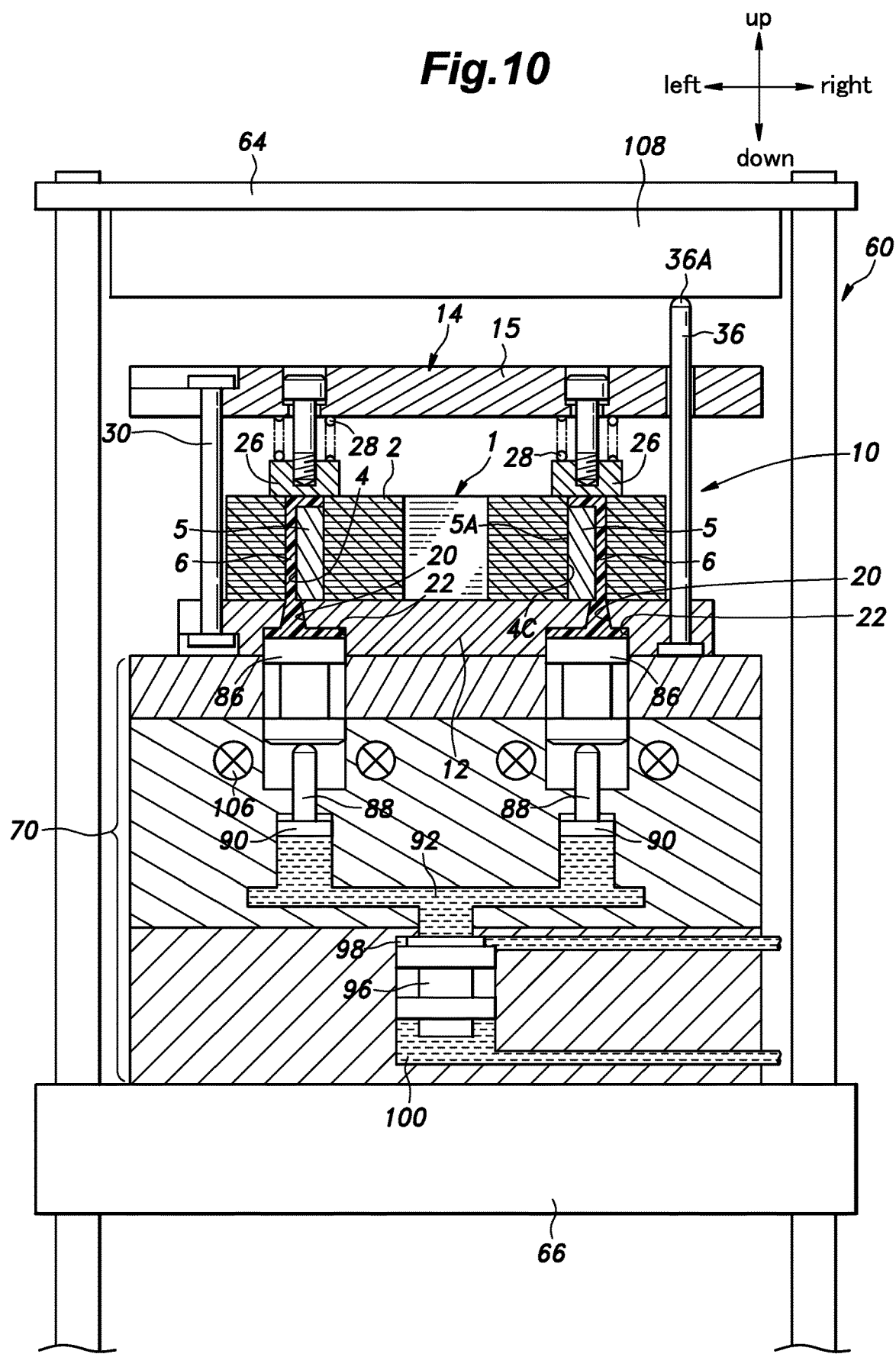
FIG. 10 is a vertical sectional view showing a resin filling state of the manufacturing device.

As shown in FIG. 9, each plate pressing rod 36 contacts against the bottom surface of the upper opposing member 108 when the movable platen 66 is moved upward, and the lower plate 12 is pressed against the lower base member 70 by the pressurizing force transmitted from the upper opposing member 108 to the lower plate 12.

Thereby, the force for pressing the lower plate 12 against the lower base member 70 is determined by the lifting force (die clamping force) of the movable platen 66 separately from the force for pressing the closure members 26 against the rotor core 2 by the spring force of the compression coil springs 28 in the rotor core retaining jig 10, and the connection between the cull openings 22 and the resin pots 80 can be achieved without a gap under the force pressing the lower plate 12 against the lower base member 70.

The solid resin 6 in each resin pot 80 is melted when heated by the electric heaters 106 or the like that serve as a heating device. Under this state, as shown in FIG. 9, a hydraulic pressure is supplied from the hydraulic pressure source (not shown) to the lower oil chamber 100, and the piston 96 is moved upward so that the pressure is distributed evenly to the pressure receiving flanges 90 and the push rods 88 with the hydraulic oil in the manifold oil passage 92 serving as a pressure medium. Thereby, the plungers 86 are lifted, and the molten resin 6 in each resin pot 80 passes through the corresponding cull opening 22 and gate 20 to be press-fed into the corresponding magnet insertion hole 4 and fill the same.

The pressure-filling of each magnet insertion hole 4 with the molten resin 6 is performed in a state where the pin members 37 and 39 allow the movement of the magnet 5 in the rotor radial direction in the magnet insertion hole 4 and restrict the movement of the same in the rotor tangential direction in the magnet insertion hole 4 within the range "the inner dimension E–the outer dimension C." Since the gate 20 is in communication with the magnet insertion hole 4 at a position offset outward in the radial direction of the rotor core 2 relative to the magnet insertion hole 4, the filling pressure of the resin injected to pressure-fill the magnet insertion hole 4 from the gate 20 acts on the magnet 5 as a force directed inward in the radial direction.

Thereby, each magnet 5 moves from the state shown in (A) of FIG. 6 inward in the radial direction of the rotor core 2 while being guided by the pin members 37 and 39 but without being hindered by the pin members 37 and 39 until one outer surface 5A of the magnet 5 comes into surface contact with the opposing inner surface 4C of the magnet insertion hole 4, as shown in (B) of FIG. 6. Also, since each of the end surfaces 5C, 5D of each magnet 5 is a flat surface extending in the first direction, movement of the magnet 5 in the magnet insertion hole 4 can be made smoothly without being hindered during the movement.

As a result of these, the magnet embedded core 1 in which the magnet 5 is positioned in each magnet insertion hole 4 as designed is manufactured efficiently.

Because the force pressing the lower plate 12 against the lower base member 70 can be independently set to an appropriate value without excess or insufficiency by adjusting the lifting force of the movable platen 66, the connection between the cull openings 22 and the resin pots 80 can be achieved under an appropriate pressing force that presses the lower plate 12 against the lower base member 70. Thereby, in the process of press-feeding the molten resin 6 from the resin pots 80 to the magnet insertion holes 4, leakage of the molten resin 6 to the outside through an interface between the lower plate 12 and the lower base member 70 is suppressed, and occurrence of burrs at the interface is suppressed.

Because the closure members 26 are pressed against the rotor core 2 by the spring force of the compression coil springs 28 separately from the lifting force of the movable platen 66, the force pressing the closure members 26 against the rotor core 2 can be independently set to an appropriate value without excess or insufficiency, separately from the force pressing the lower plate 12 against the lower base member 70. Thereby, without causing deformation such as a warp in the rotor core 2, the closure of the openings 4B of the magnet insertion holes 4 and the connection between the openings 4A of the magnet insertion holes 4 and the gate 20 can be achieved with an appropriate value of the force pressing the closure members 26 against the rotor core 2. Thereby, in the process of press-feeding the molten resin 6 from the resin pots 80 to the magnet insertion holes 4, leakage of the molten resin 6 to the outside from the openings 4B of the magnet insertion holes 4 or through the interface between the openings 4A of the magnet insertion holes 4 and the gate 20 is suppressed, and occurrence of burrs at the interface or around the openings 4B is suppressed.

Figure 4:
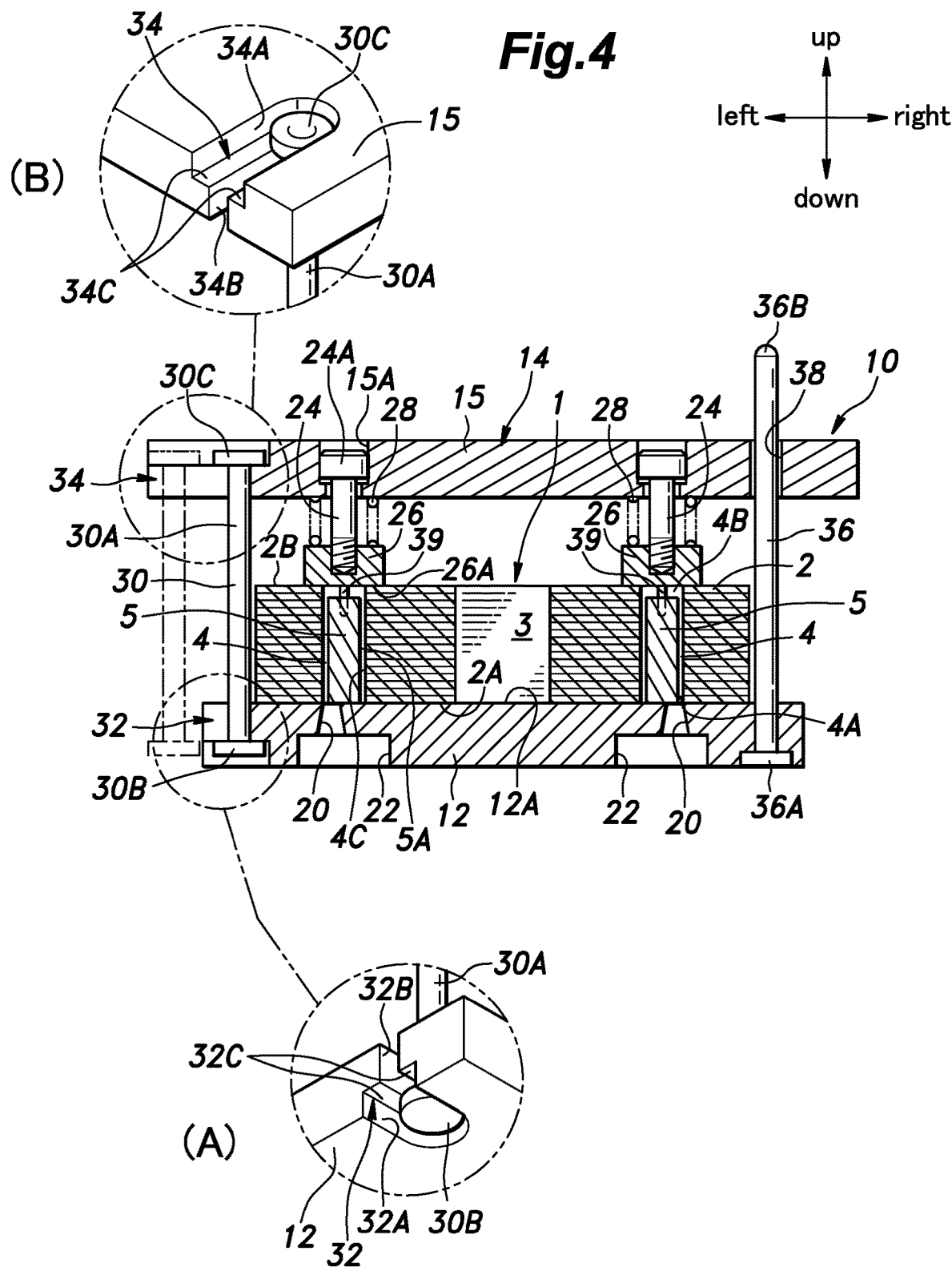
FIG. 4 is a sectional view taken along line IV-IV in FIG. 3.
Figure 5:
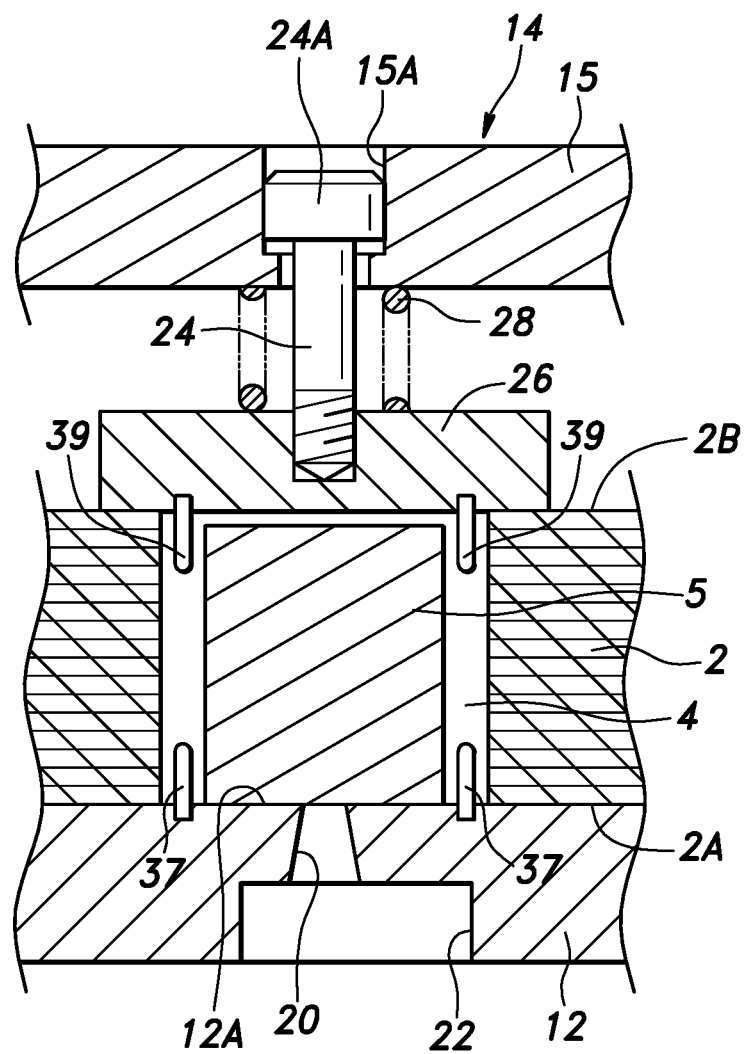
FIG. 5 is an enlarged sectional view taken along line V-V in FIG. 3.
Figure 7:
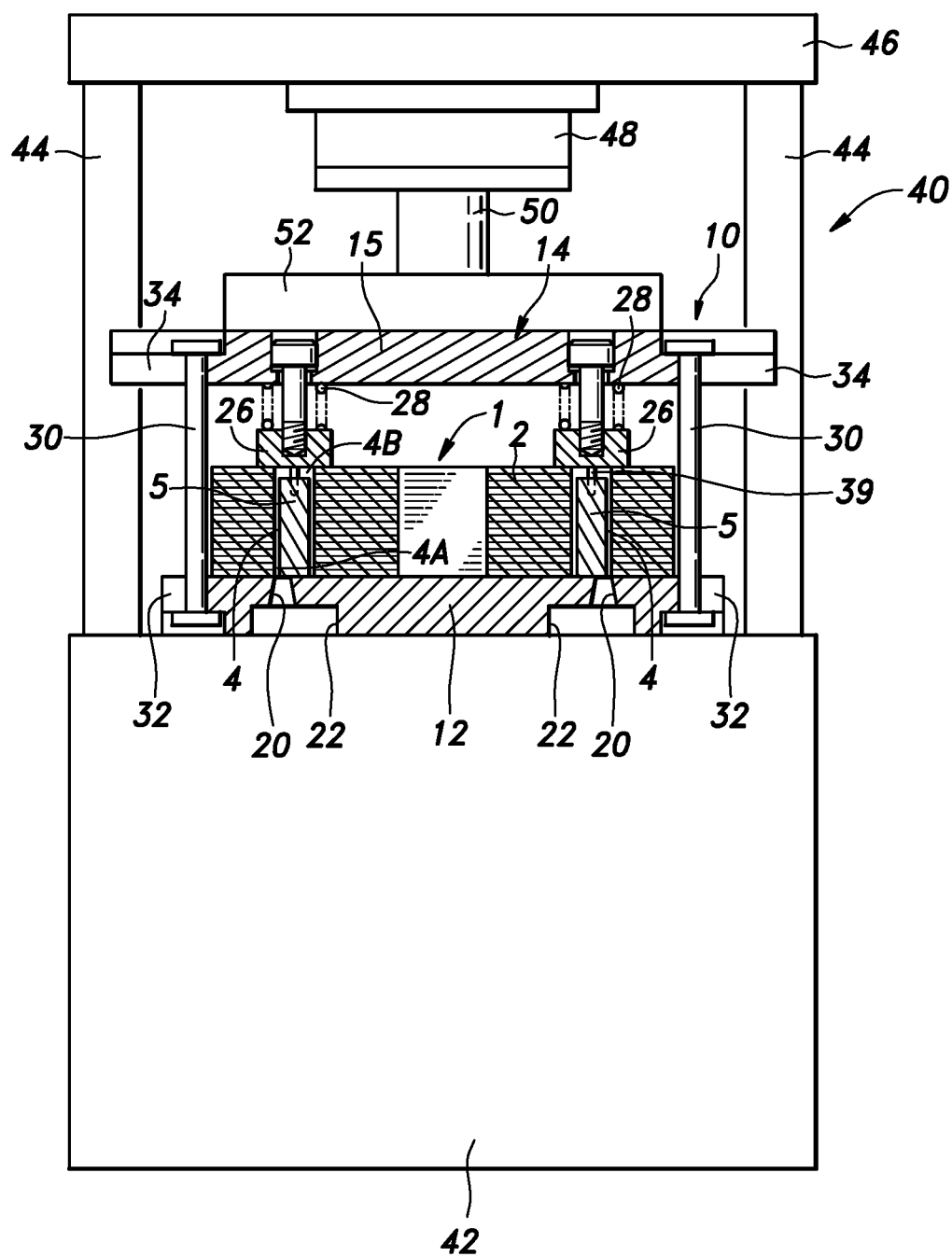
FIG. 7 is a front view of a setting device that is used when the rotor core retaining jig according to the present embodiment is used.
Figure 11:
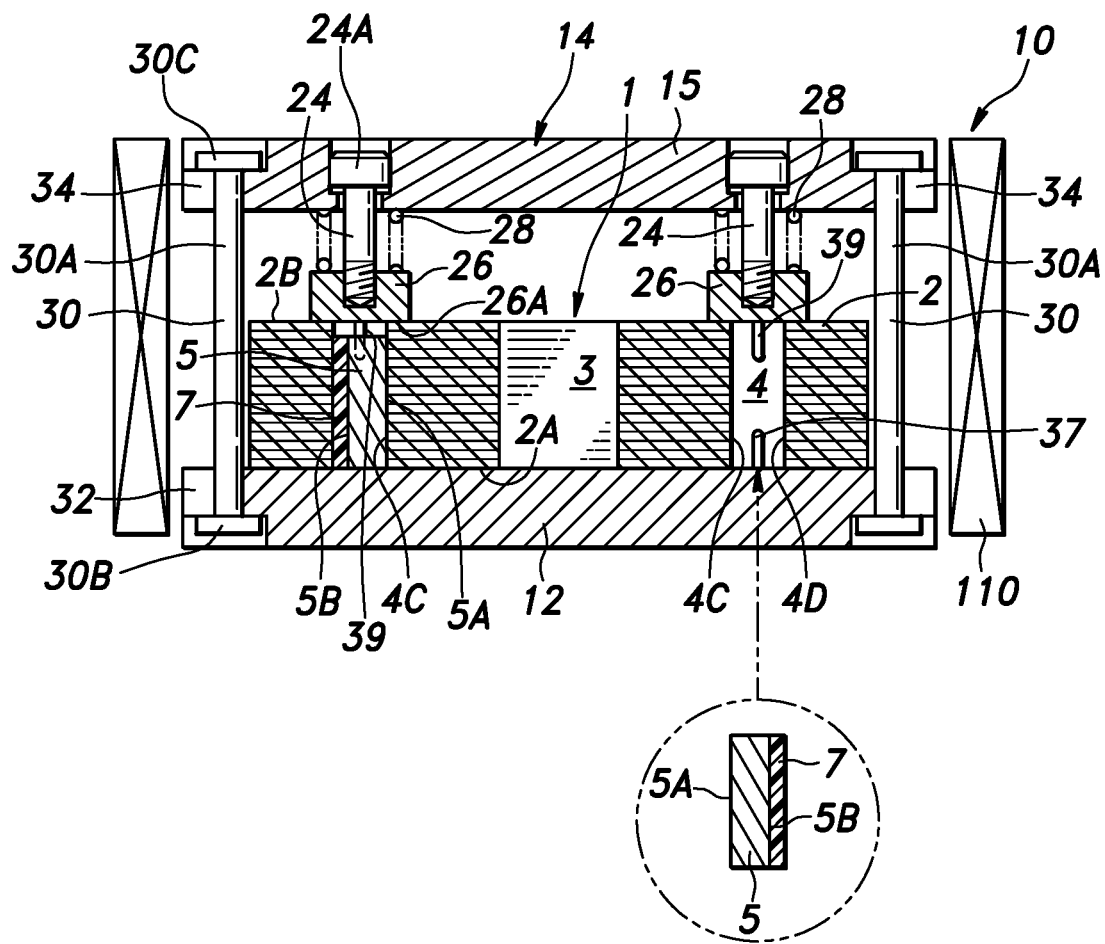
FIG. 11 is a vertical sectional view of a rotor core retaining jig according to another embodiment.

Next, another embodiment of the rotor core retaining jig 10 and the manufacturing method for the magnet embedded core 1 will be described with reference to FIG. 11. Note that in FIG. 11, the parts corresponding to those in FIG. 4 are denoted by the same reference signs as those in FIG. 4, and the description thereof is omitted.

In this embodiment also, as in the aforementioned embodiment, the lower plate 12 and the closure members 26, which form a part of the upper plate 14, are provided with the pin members 37 and 39. In each magnet insertion hole 4, a magnet 5 having an unfoamed foamable resin sheet 7 pasted or otherwise provided on one outer surface 5B (outer surface on the outer side in the rotor radial direction) thereof is inserted. The foamable resin sheet 7 may be the one that foams and expands when heated like heat-foamable resin such as foamable epoxy resin or the like.

Around an outer circumference of the lower plate 12 and the plate main body 15, which forms a part of the upper plate 14, an electric heater 110 serving as a heating device is provided so as to surround them. The electric heater 110 heats the foamable resin sheet 7 in each magnet insertion hole 4 via the rotor core 2 placed on the lower plate 12.

Note that in the present embodiment, the gates 20 and the cull openings 22 provided in the lower plate 12 for resin filling are unnecessary.

By heating the foamable resin sheet 7 in each magnet insertion hole 4 by the electric heater 110 via the rotor core 2, the foamable resin sheet 7 foams and expands in the magnet insertion hole 4. The pressure produced by the foaming of the foamable resin sheet 7 acts on the magnet 5 as a force directed inward in the radial direction.

Thereby, each magnet 5 moves inwardly in the radial direction of the rotor core 2 while being guided by the pin members 37 and 39 but without being hindered by the pin members 37 and 39 until one outer surface 5A of each magnet 5 comes into contact with the opposing inner surface 4C of the magnet insertion hole 4. As a result of this, the magnet embedded core 1 in which the magnet 5 is positioned in each magnet insertion hole 4 as designed is manufactured efficiently.

Figure 12:
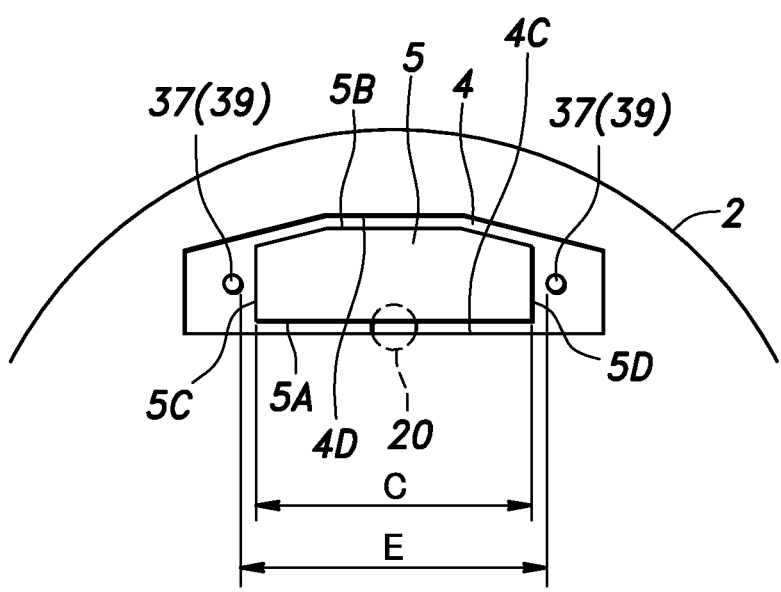
FIG. 12 is an enlarged plan view of a main part of a rotor core retaining jig and a magnet embedded core according to another embodiment.
Figure 13:
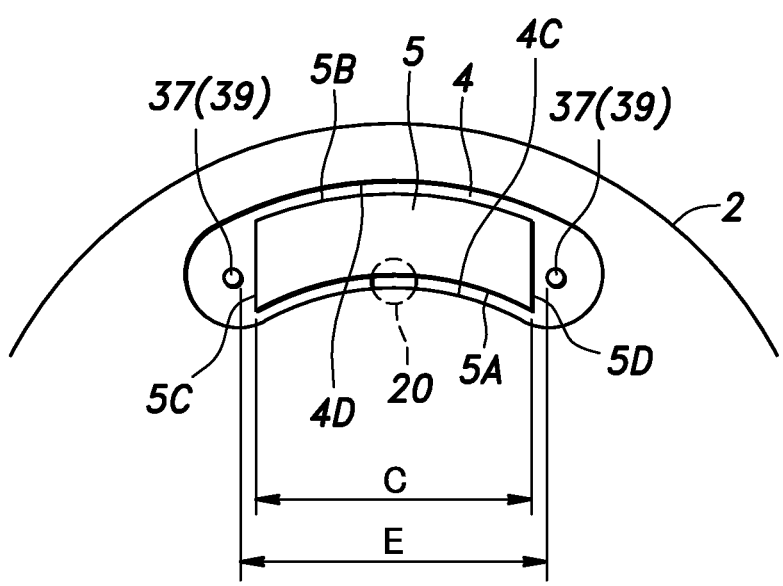
FIG. 13 is an enlarged plan view of a main part of a rotor core retaining jig and a magnet embedded core according to another embodiment.
Figure 14:
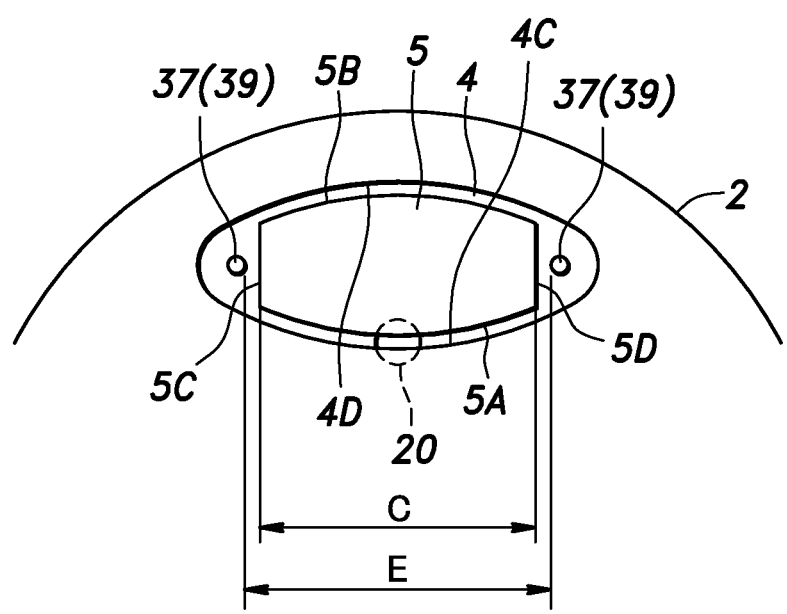
FIG. 14 is an enlarged plan view of a main part of a rotor core retaining jig and a magnet embedded core according to another embodiment.

FIG. 12 to FIG. 14 show variations of the shapes of the magnet insertion hole 4 and the magnet 5 to which the manufacturing device and the manufacturing method of the present invention can be applied.

In the embodiment shown in FIG. 12, both end parts of the outer surface 5B of the magnet 5 in the second direction are in a slanted shape like a chamfer. The inner surface 4D of the magnet insertion hole 4 that opposes the outer surface 5B is also in a slanted shape similarly to the outer surface 5B so as to squarely face the outer surface 5B.

In the embodiment shown in FIG. 13, the magnet 5 is in the shape of a concave lens as viewed in the axial direction of the rotor core 2, with the outer surface 5A thereof consisting of a concave circular arc surface and the outer surface 5B thereof consisting of a convex circular arc surface. The inner surface 4C of the magnet insertion hole 4 consists of a convex circular arc surface and squarely faces the outer surface 5A, while the inner surface 4D consists of a concave circular arc surface and squarely faces the outer surface 5B.

In the embodiment shown in FIG. 14, the magnet 5 is in the shape of a convex lens as viewed in the axial direction of the rotor core 2, with the outer surfaces 5A and 5B consisting of convex circular arc surfaces. The inner surfaces 4C and 4D of the magnet insertion hole 4 consist of concave circular arc surfaces so as to squarely face the outer surfaces 5A and 5B, respectively.

In any of the embodiments of FIG. 12 to FIG. 14 also, the inner dimension E between the pair of pin members 37 or between the pair of pin members 39 is larger than the outer dimension C of the magnet 5 in the same direction as the second direction. Thereby, in the state where the magnet insertion hole 4 is not filled with the resin 6, each of the pin members 37 and 39 does not hinder the movement of the magnet 5 in the magnet insertion hole 4 in the first direction, namely, allows the movement of the magnet 5 in the magnet insertion hole 4 in the first direction of the magnet insertion hole 4 and restricts the movement of the magnet 5 in the magnet insertion hole 4 in the second direction (the rotor tangential direction) within a range of "the inner dimension E–the outer dimension C."

Thereby, in any of the embodiments of FIG. 12 to FIG. 14 also, effects similar to those of the above-described embodiment can be obtained.

In the embodiments of FIG. 12 to FIG. 14, the gate 20 is in communication with the magnet insertion hole 4 at a position offset inward in the radial direction of the rotor core 2 relative to the magnet insertion hole 4, whereby the filling pressure of the resin injected to pressure-fill the magnet insertion hole 4 from the gate 20 acts on the magnet 5 as a force directed inward in the radial direction.

Thereby, each magnet 5 moves outward in the radial direction of the rotor core 2 while being guided by the pin members 37 and 39 but without being hindered by the pin members 37 and 39 until the one outer surface 5B of the magnet 5 comes into surface contact with the opposing inner surface 4D of the magnet insertion hole 4.

In the foregoing, the present invention has been described in terms of specific embodiments, but these embodiments are for illustrative purposes only, and the present invention is not limited by these embodiments.

For example, the pin members 37, 39 serving as the restriction members may be provided on only the lower plate 12 or only the closure members 26 which form a part of the upper plate 14. The restriction members are not limited to the pin members 37, 39 and may be protrusion-like parts formed on the lower plate 12 and/or the closure members 26.

Instead of the closure members 26 supported in a floating manner from the plate main body 15 via the compression coil springs 28, the closure members 26 may be configured to be integral with the plate main body 15.

It is not necessarily required that the entirety of the outer surface 5A of each magnet 5 is in surface contact with the inner surface 4C of the magnet insertion hole 4. The magnet insertion hole 4 is only required to be configured such that the inner surface 4C or 4D thereof against which the outer surface 5A or 5B of the magnet 5 contacts has a shape conformal to the corresponding outer surface 5A or 5B of the magnet 5. The magnet insertion hole 4 may be a tapered hole instead of a straight hole.

Figure 15:
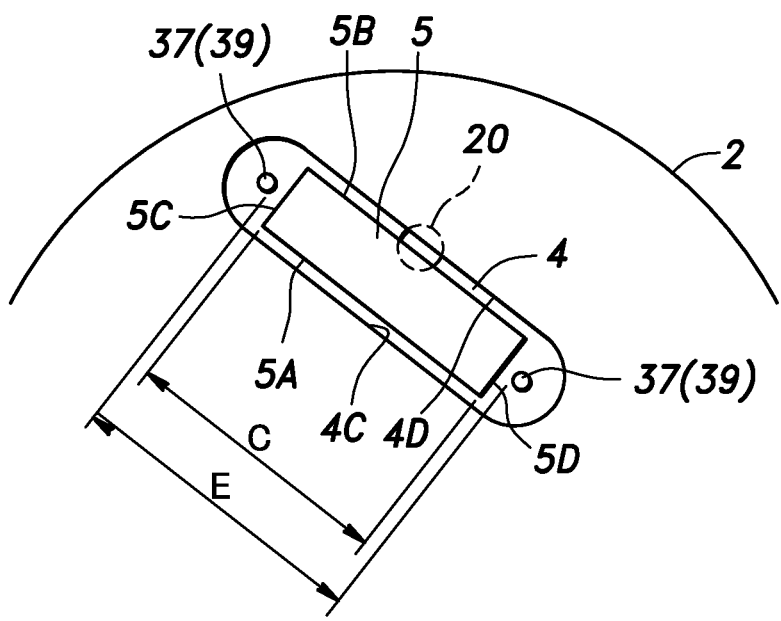
FIG. 15 is an enlarged plan view of a main part of a rotor core retaining jig and a magnet embedded core according to another embodiment.

In the illustrated example, the magnet insertion holes 4 are arranged at four positions spaced in the circumferential direction of the rotor core 2 at equal intervals and the shape and arrangement of the magnet insertion holes 4 and the magnets 5 are simplified for conciseness of explanation, but the shape, number, arrangement, etc. of the magnet insertion holes 4 and the magnets 5 are not limited to this and various modifications are possible. For example, as shown in FIG. 15, the magnet insertion holes 4 and the magnets 5 may be arranged to be inclined relative to the radial direction of the rotor core 2. Also, the resin molding device 60 may be arranged upside down.

The constituent elements of the manufacturing method for the magnet embedded core of the present invention shown in the foregoing embodiments are not entirely essential, but may be suitably omitted or substituted without departing from the scope of the present invention.

GLOSSARY 1 magnet embedded core
2 rotor core
2A lower end surface
2B upper end surface (one end surface)
3 axial hole
4 magnet insertion hole
4A opening (one opening)
4B opening (another opening)
4C inner surface
4D inner surface
4E semi-cylindrical inner surface
4F semi-cylindrical inner surface
5 magnet
5A outer surface
5B outer surface
5C end surface
5D end surface
7 foamable resin sheet
10 rotor core retaining jig
12 lower plate (first plate)
12A top surface
14 upper plate (second plate)
15 plate main body
15A bolt insertion hole
20 gate
22 cull opening
24 bolt
24A head
26 closure member
26A bottom surface
28 compression coil spring
30 coupling rod (coupling member)
30A rod portion
30B flange portion
30C flange portion
32 engagement groove
32A recessed groove
32B opening
32C shoulder portion
34 engagement groove
34A recessed groove
34B opening
34C shoulder portion
36 plate pressing rod
37 pin member (restriction member)
38 through hole
39 pin member (restriction member)
40 core setting device
42 support base
44 post member
46 opposing base
48 pressurizing device
50 piston rod
52 pressurizing plate
60 resin molding device
62 post member
64 fixed platen
66 movable platen
70 lower base member
72 lower member
74 intermediate member
76 upper member
80 resin pot
82 plunger chamber
84 push rod chamber
86 plunger
88 push rod
90 pressure receiving flange
92 manifold oil passage
94 cylinder chamber
96 piston
98 upper oil chamber
100 lower oil chamber
102 oil passage
104 oil passage
106 electric heater (heating device)
108 upper opposing member
110 electric heater (heating device)
A spacing dimension
B spacing dimension
C outer dimension
D dimension
E inner dimension

The invention claimed is:

1. A manufacturing device for a magnet embedded core in which a magnet is inserted in a magnet insertion hole which is formed in a rotor core to extend along an axial direction and to have both ends open, the magnet being fixed to the rotor core with resin, wherein:

the magnet includes at least two outer surfaces facing in mutually opposite directions and two end surfaces provided on respective side ends of the two outer surfaces, and the magnet insertion hole includes two inner surfaces having a spacing dimension larger than a spacing dimension of the two outer surfaces of the magnet so as to oppose the respective outer surfaces of the magnet, the manufacturing device comprising:

a first plate and a second plate configured to contact against two end surfaces of the rotor core, respectively; and restriction members provided on at least one of the first plate and the second plate, wherein the restriction members are capable of entering the magnet insertion hole and provided at positions opposing the respective end surfaces of the magnet to allow movement of the magnet in a first direction, which is a separation direction of the two inner surfaces of the magnet insertion hole, and to restrict movement of the magnet in a second direction orthogonal to the first direction as viewed in the axial direction of the magnet insertion hole.

2. The manufacturing device for the magnet embedded core according to claim 1, wherein each end surface of the magnet is a flat surface extending in a same direction as the first direction.

3. The manufacturing device for the magnet embedded core according to claim 1, wherein the restriction members are constituted of a pair of pin members, and an inner dimension between the pair of pin members is larger than an outer dimension of the magnet in a same direction as the second direction.

4. The manufacturing device for the magnet embedded core according to claim 1, wherein the second plate includes a plate main body and a closure member provided on the plate main body via a compression spring member so as to be movable in the axial direction and configured to close an opening of the magnet insertion hole, and the restriction members are provided on the closure member.

5. The manufacturing device for the magnet embedded core according to claim 4, comprising a coupling member configured to couple the first plate and the second plate to each other such that a spring force of the compression spring member becomes a prescribed value.

6. The manufacturing device for the magnet embedded core according to claim 1, wherein the first plate includes a gate for resin filling, the gate being configured to be in communication with the magnet insertion hole at a position offset to one side in the first direction relative to the magnet insertion hole.

7. The manufacturing device for the magnet embedded core according to claim 1, comprising a heating device configured to heat the resin that is heat-foamable and located between one inner surface of the two inner surfaces of the magnet insertion hole and the outer surface of the magnet opposing the one inner surface.

8. A manufacturing method for a magnet embedded core, the method using the manufacturing device for the magnet embedded core according to claim 1 and comprising:
   pressure-filling the magnet insertion hole with the resin that has been molten from an outside in a state where the magnet is inserted in the magnet insertion hole so that a filling pressure of the resin causes the magnet to move in the first direction while being guided by the restriction members to cause one of the outer surfaces of the magnet to contact an opposing one of the inner surfaces of the magnet insertion hole.

9. A manufacturing method for a magnet embedded core, the method using the manufacturing device for the magnet embedded core according to claim 1 and comprising:
   inserting the magnet provided with an unfoamed heat-foamable resin sheet on one of the outer surfaces thereof into the magnet insertion hole; and
   causing the resin sheet to foam in the magnet insertion hole so that a pressure produced by foaming causes the magnet to move in the first direction while being guided by the restriction members to cause one of the outer surfaces of the magnet to contact an opposing one of the inner surfaces of the magnet insertion hole.

* * * * *